United States Patent [19]
Eglit

[11] Patent Number: 6,005,544
[45] Date of Patent: Dec. 21, 1999

[54] DIGITAL DISPLAY UNIT IN A COMPUTER SYSTEM FOR ENABLING A USER TO CONVENIENTLY SELECT A DESIRED MONITOR MODE FOR DISPLAYING IMAGES ENCODED IN A RECEIVED ANALOG DISPLAY SIGNAL

[75] Inventor: Alexander Julian Eglit, Half Moon Bay, Calif.

[73] Assignee: Paradise Electronics, Inc., San Jose, Calif.

[21] Appl. No.: 09/023,815

[22] Filed: Feb. 13, 1998

[51] Int. Cl.$^6$ ........................................ H04N 17/02
[52] U.S. Cl. .............................. 345/115; 345/329
[58] Field of Search ........................... 345/115, 119, 345/112, 116, 133, 145, 147, 156, 326, 340, 328, 185, 189, 329, 330; 348/180, 184

[56] References Cited

U.S. PATENT DOCUMENTS

| | | | |
|---|---|---|---|
| 4,991,023 | 2/1991 | Nicols | 358/242 |
| 5,031,118 | 7/1991 | Morizot | 364/521 |
| 5,579,029 | 11/1996 | Arai et al. | 345/132 |
| 5,721,959 | 2/1998 | Nakamura et al. | 395/919 |
| 5,754,222 | 5/1998 | Daly et al. | 348/184 |
| 5,754,242 | 5/1998 | Ohkami | 348/441 |
| 5,790,797 | 8/1998 | Shimada et al. | 395/200.54 |
| 5,847,691 | 12/1998 | Mistrot | 345/115 |
| 5,861,864 | 1/1999 | Jensen | 345/115 |
| 5,874,960 | 2/1999 | Mairs et al. | 345/340 |

*Primary Examiner*—Steven Sax
*Attorney, Agent, or Firm*—Law Firm of Naren Thappeta

[57] ABSTRACT

A digital display unit for enabling a user to conveniently select a desired monitor mode to process a display signal. A monitor mode is generally selected by measuring some display signal parameters. If multiple source modes share the same display signal values, all the corresponding monitor modes are stored associated with these common display signal parameter values. The user is provided a convenient interface (such as pushing a button or using a menu provided with an on-screen-display) to cause the display monitor to change the monitor mode. The next monitor mode is again among those associated with the measured display signal parameter values. Accordingly, all the monitor modes associated with the measured display signal parameters can be tried using the interface until a satisfactory display is obtained on the display unit.

14 Claims, 6 Drawing Sheets

DIGITAL DISPLAY UNIT IN A COMPUTER SYSTEM FOR ENABLING A USER TO CONVENIENTLY SELECT A DESIRED MONITOR MODE FOR DISPLAYING IMAGES ENCODED IN A RECEIVED ANALOG DISPLAY SIGNAL

BACKGROUND OF THE INVENTION

1. Field of the Invention

The present invention relates to computer graphics systems, and more specifically to a method and apparatus implemented in a digital display unit of a computer system for enabling a user to conveniently select a monitor mode corresponding to a received analog display signal.

2. Related Art

Digital display units (e.g., flat panel monitors) are often used to display images encoded in an analog display signal. A signal in SVGA format generated by a graphics controller circuit of a computer system is an example of such an analog display signal. An analog display signal generally includes display data signal and corresponding synchronization signals. The display data signal identifies a color intensity for each point of an image and the synchronization signals provide a time reference such that each portion of the display data signal can be correlated with a corresponding portion of the image.

In general, an analog display signal includes multiple frames, with each frame corresponding to an image. Each frame in turn includes multiple horizontal lines. The synchronization signals typically include horizontal and vertical synchronization signals to indicate transitions to next horizontal line and next frame respectively in the associated display data signal.

A digital display unit typically needs to process a received analog display signal to display the encoded images. Digital display units are usually capable of processing the received signal in one of several modes ("monitor modes"). The display signal parameters (described below) and other user-defined (or manufacturer-defined) parameters generally define a monitor mode. Using pixel data elements generated according to a monitor mode, the digital display unit actuates pixels (points) contained on a digital display screen.

For the sampled values to accurately represent the images encoded in a received display signal, a monitor mode needs to correspond to the 'source mode' in which an analog display signal is generated. A source mode characterizes the display signal parameters with which the display signal is generated. For example, each mode may be characterized by the refresh rate (number of frames encoded in the display signal per second), the number of lines in each frame, the number of points forming each horizontal line, among others. As an illustration, the alphanumeric mode of the VGA standard may have a refresh rate of 70 Hertz (i.e., number of frames per second), with each frame including 400 horizontal lines (source image height) and each horizontal line including 720 pixel data element samples (source image width). The need for the monitor mode to correspond to the source mode in a typical digital display unit can be appreciated by considering the manner in which an example analog display signal is generated.

In a typical situation in a computer system, a source image is represented by a plurality of pixel data elements, with each pixel data element representing a point (pixel position) on the image. In the case of the alphanumeric mode of the VGA standard, a source image may be stored as 720 (source image width)×400 (source image height) pixel data elements. A graphics controller circuit generates an analog display signal with image frames by converting each pixel data element into corresponding display data signal. A digital to analog converter (DAC) and a source clock (dot clock) are typically used for such a conversion.

As the analog display signal is typically designed to operate in conjunction with analog display monitors which need time for horizontal retrace while scanning horizontal lines of the analog display screen, the total number of pixels (HTOTAL) in each line is typically more than the source image width. For example, for the alphanumeric mode of the VGA standard, HTOTAL equals 900 pixels even though the source image width is 720. Similarly, VTOTAL representing the number of vertical lines in each frame is more than the source image height to allow for vertical retrace.

In general, a digital display unit needs to sample a received analog display signal to recover the pixel data elements from which the display signal was generated. For accurate recovery, the number of samples taken in each horizontal line needs to equal HTOTAL. Each horizontal line is usually identified by successive horizontal synchronization pulses. If the number of samples taken is not equal to HTOTAL, the sampling may be inaccurate and display artifacts may results as described with reference to FIG. 1.

FIGS. 1 is a diagram of the amplitude of a display signal as a function of time illustrating typical characteristics of analog display signals. Typically, a display signal portion for each pixel data element has a settling period (shown as 110-A and 110-B) before the steady-state (150-A and 150-B) is reached. The steady-state represents the value (e.g., color intensity) of the pixel data element in the source image. For an accurate reproduction of the source image pixel data values, the monitor mode needs to be designed to sample during steady-state. Hence, a digital display unit may need to sample each horizontal line of a received display signal a number of times equal to HTOTAL.

Therefore, a digital display unit typically needs the HTOTAL for accurate sampling of the received analog display signal. There are other display signal parameters which a digital display unit may need for accurate sampling of a received display signal. The number of colors, the horizontal start position (representing the pixel number in each horizontal line from which the source image data starts) and vertical start position (representing the line number from which the source image data starts) are examples of some of the other display parameters. A monitor mode is defined by monitor parameters which typically include at least some of such display parameters. Monitor modes include other parameters such as gamma correction and intensity (adjusted by user).

Many parameters are often defined by standards (e.g., VGA, SVGA) and a typical digital display unit measures some parameters and determines the others by examining data stored internally. That is, signal parameters such as VTOTAL, synchronization signal polarities, the time for receiving each horizontal line are measured. Data such as tables or arrays to correlate a set of measured parameters to a corresponding source mode is often maintained internally in a non-volatile memory. By determining a source mode according to the measured parameters and the stored data, the display signal parameters (such as HTOTAL) associated with the determined mode are used to process any subsequently received analog display signals.

One problem with the above-described scheme of determining the source mode is that some modes have the same display signal parameters even though the modes represent source images having different characteristics (e.g., size). For example, the alpha-numeric mode of the VGA standard generates display signals at 70 frames/second, with each frame representing 720×400 pixels. The graphics APA mode generates display signals at 70 frames/second with 640×400 pixels. Besides having the same refresh rate and source image height, the two modes can use the same polarities for the synchronization signals. At least for similar reasons, some source modes may not be distinguishable based purely on the measurement of some display signal parameters.

If a monitor mode is selected based on an incorrect source mode, the sampling can be inaccurate and display artifacts can result. In the above-noted examples, the APA mode display signal is generated with a HTOTAL of 800 with a horizontal start position of 147, and VGA alpha-numeric display signal is generated with a HTOTAL of 900 with a horizontal start position of 160. If a received signal is sampled with the wrong HTOTAL, at least some of the samples will be taken in the unstable settling periods of FIG. 1 and the incorrect sampling values result in display artifacts.

In addition, as the source widths are also different (640 for APA mode versus 720 for VGA alpha-numeric mode), the corresponding correct number of pixel data elements need to be used for display to avoid losing a portion of the image. Further, incorrect assumption of the start positions (horizontal or vertical) typically leads to the image being skewed incorrectly to a direction. Such effects may be undesirable.

Digital display units may use monitor modes with incorrect parameters in other situations as well. For example, given the same standard for a source, different manufacturers can implement the standard with different display signal parameters. As an illustration, manufacturers may maintain the same values for display signal parameters which can be readily measured, but have different values for parameters which cannot be measured. The HTOTAL and start positions can be different. In such situations also a display unit may sample a received analog display signal with incorrect monitor parameters, causing undesirable artifacts or skews in the displayed images.

Therefore, what is needed is a method and apparatus which enables a user to conveniently select a monitor mode which corresponds to the correct source mode when more than one source mode has the same measured display signal parameters.

SUMMARY OF THE INVENTION

The present invention is directed to a digital display unit. The digital display unit receives an analog display signal generated according to a source mode and measures some of the display signal parameters. Typically, parameters such as refresh rate and VTOTAL which can be determined by examining the display signal are measured. The measured display parameter values are used to determine a monitor mode according to which the analog display is to be processed. The images encoded in the display signal are displayed as a result of such processing.

In accordance with the present invention, multiple monitor modes are associated with each set of values corresponding to the display signal parameters which are to be measured for monitor mode determination. Each of such monitor modes can correspond to a corresponding one of the source modes which generate display signals with the same display signal parameters. That is, monitor modes which cannot be distinguished based on an examination of the display signal are associated with the same set of display signal parameter values. The monitor mode parameters defining the monitor mode are stored associated with the corresponding monitor mode in a non-volatile memory.

In an embodiment, the digital display unit selects one of the multiple monitor modes when an analog display signal with a corresponding set of display signal parameters is received. However, the user has the option to request that the display signal be processed with another monitor mode from then on. For example, the user may press a button provided on the display unit when the image display is not of acceptable quality to request a change of monitor mode.

In response, the digital display unit chooses another one of the multiple monitor modes associated with the same set of display signal parameter values. The modes can be chosen in, for example, circular or sequential fashion. As only the modes associated with a matching set of parameters are used for processing the display signal, the desired monitor mode is likely to be selected in a relatively few turns.

Thus, the present invention enables an analog display signal generated using a source mode to be processed by a desired monitor mode even though several other source modes generate display signals with the same display signal parameter values measured for monitor mode determination. Such a feature is provided by storing multiple monitor modes associated with a set of display signal parameter values, and processing the display signal according to any of the modes which a user may specify.

The present invention provides a convenient mechanism by which a user can cause an analog display signal to be processed by a desired monitor mode. Such a feature is provided by selecting the monitor modes associated with the same display signal parameter values in a circular or sequential fashion when the user indicates that a next monitor mode is to be used.

The present invention enables the desired monitor mode to be selected quickly as only the monitor modes with a matching set of parameters are chosen for display.

The present invention enables a user to use digital display units in conjunction with graphics controllers which generate analog signals with display signal parameters which vary in minor respects from the industry standards. Such a feature is provided by enabling a user to either adjust the monitor mode for satisfactory sampling and storing the changed parameters or by determining the monitor mode parameters and storing the operating mode as a new mode.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

In accordance with the present invention, some of the display signal parameters are measured to determine a suitable monitor mode for processing the received analog display signal. Multiple potential suitable monitor modes can be associated with each set of display signal parameter values. Each monitor mode has a set of monitor parameters, some of them being equal to the display signal parameters. A user is provided the interface to have an analog display signal to be sampled using each of the potential suitable monitor modes associated with a set of display signal parameters equaling the measured set of display signal parameters.

For example, the digital display unit may measure display signal parameters and choose one of the monitor modes associated with the measured parameters. When a user indicates that the monitor mode needs to be changed (for example by pressing a button), the digital display unit continues sampling the display signal using another one of the monitor modes associated with the measured parameter values. The monitor mode can be changed by the user until the correct monitor mode is used for sampling the analog display signal.

In addition, a user may change some monitor parameters and save the monitor parameters as a new monitor mode associated with the then measured display signal parameters. For example, in one type of display a user may wish the pixels displayed at a higher intensity and in another display the user may wish the pixels displayed at a lower intensity. These two modes can be saved as two different modes associated with the same measured display signal parameters.

The present invention is described below in further detail with reference to one or more example embodiments. First, an example environment in which the present invention can be used is described. Next, a general method of implementing the present invention is described. Then, a digital display unit implementing the present invention is described.

2. Example Environment

In a broad sense, the invention can be implemented in any computer system having a digital display unit such as a flat panel monitor. Such computer systems include, without limitation, lap-top and desk-top personal computer systems, work-stations, special purpose computer systems, general purpose computer systems, network computers, and many others. The invention may be implemented in hardware, software, firmware, or combination of the like.

Figure 1:
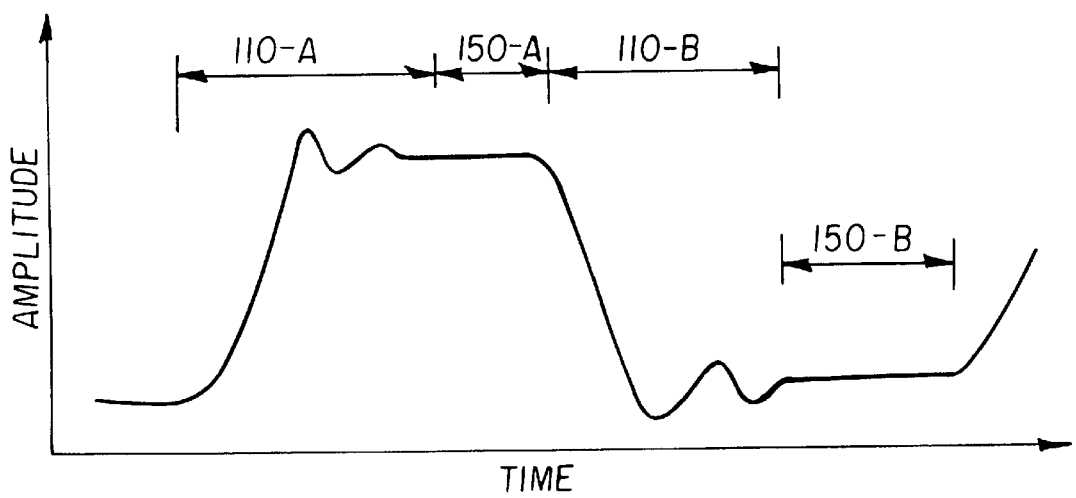
FIG. 1 is a diagram of an analog display signal as a function of time illustrating the stable and settling portions of the signal when generated from pixel data elements.
Figure 2:
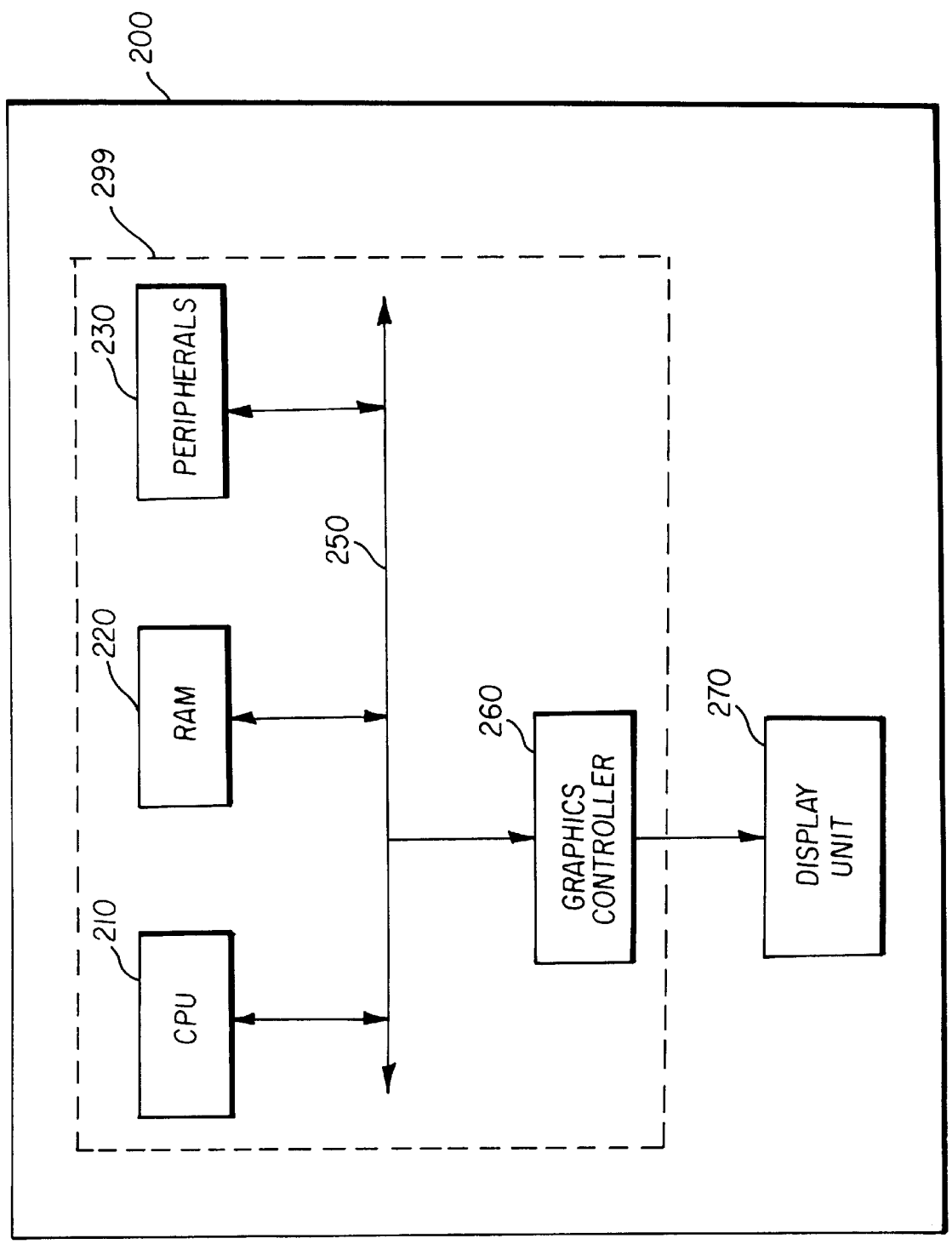
FIG. 2 is a block diagram of a computer system illustrating an example environment for implementing the present invention.

FIG. 2 is a block diagram of computer system 200 in which the present invention can be implemented. Computer system 200 includes central processing unit (CPU) 210, random access memory (RAM) 220, one or more peripherals 230, graphics controller 260, and digital display unit 270. CPU 210, RAM 220 and graphics controller 260 are typically packaged in a single unit, and such a unit is referred to as graphics source 299 as the display signal is generated by the unit. All the components in graphics source 299 of computer system 200 communicate over bus 250, which can in reality include several physical buses connected by appropriate interfaces.

RAM 220 stores data representing commands and possibly pixel data representing a source image. CPU 210 executes commands stored in RAM 220, and causes different commands and pixel data to be transferred to graphics controller 260. Peripherals 230 can include storage components such as hard-drives or removable drives (e.g., floppy-drives). Peripherals 230 can be used to store commands and/or data which enable computer system 200 to operate in accordance with the present invention. By executing the stored commands, CPU 210 provides the electrical and control signals to coordinate and control the operation of various components.

Graphics controller 260 receives data/commands from CPU 210, generates analog display signals including display data and corresponding synchronization signals, and provides both to display unit 270. Graphics controller 260 can generate an analog display signal in the RS-170 standard with RGB signals. It should be further understood that the present invention can be implemented with analog image data and/or reference signals in other standards even though the present description is provided with reference to RGB signals. Examples of such standards include composite sync standard usually implemented on Macintosh Computer Systems and Sync on Green standard.

In general, graphics controller 260 first generates pixel data elements of a source image with a predefined width and height (measured in terms of number of pixel data elements) determined by a source mode. The pixel data elements for a source image may either be provided by CPU 210 or be generated by graphics controller 260 in response to commands from CPU 210.

The source mode is typically determined based on a combination of user configuration (which specifies the general standard of the source mode) and the manufacturer implementing the graphics controller 260. As noted in the section entitled "Background of the Invention", different manufacturers can implement different standards with slight variations in the display signal parameters. The source mode typically specifies several display signal parameters including the width, height, HTOTAL, VTOTAL, refresh rate, color depth (number of bits to represent each color) etc.

Graphics controller 260 generates a display signal based on the pixel data elements according to the display signal parameters of the source mode. The display signal is generally generated by using a digital-to-analog converter (DAC), which converts each pixel data element (specifying a color intensity) into a corresponding display signal portion. In one embodiment, the analog display signal is in the form of RGB signals and the reference signal includes the VSYNC and HSYNC signals well known in the art and explained in detail below. Therefore, three analog display signals (red, green and blue) are generated from each pixel data element. For conciseness, the present invention is described with reference to one display data signal. It should be understood that the description may be applicable to all the three display data signals.

Digital display unit 270 receives the analog display signal from graphics controller 260, and samples the received signal according to a monitor mode. The monitor mode is defined by various parameters (such as frequency, the pixel position from which the pixel data elements forming an image are assumed to be present). Display unit 270 typically measures some of the parameters by examining the received signal and attempts to determines a corresponding monitor mode. For example, VTOTAL, refresh rate, and the polarity of the synchronization signals can be measured.

In one embodiment, a single monitor mode and associated parameters are maintained (or stored) for each combination of the measured values. When a correct source mode is not determined due to, for example, the reasons noted in the section entitled, "Background of the Invention" above, a user is provided the ability to adjust various parameters (such as HTOTAL, start positions etc.) until a satisfactory sampling (or display) is achieved. The monitor mode values of the satisfactory monitor mode replace the parameters associated with the measured values.

One problem with the embodiment of above is that computer system 200 executes different applications which generate display signals in different source modes with the same measured values. A user may often switch between these different applications. For a satisfactory display, the user may need to change the display parameters each time the application is changed. Making such adjustments can be unproductive and thus undesirable. Therefore, the present invention enables the user to conveniently specify a desired monitor mode with a received analog display signal as described below in further detail.

3. Method of the Present Invention

Figure 3:
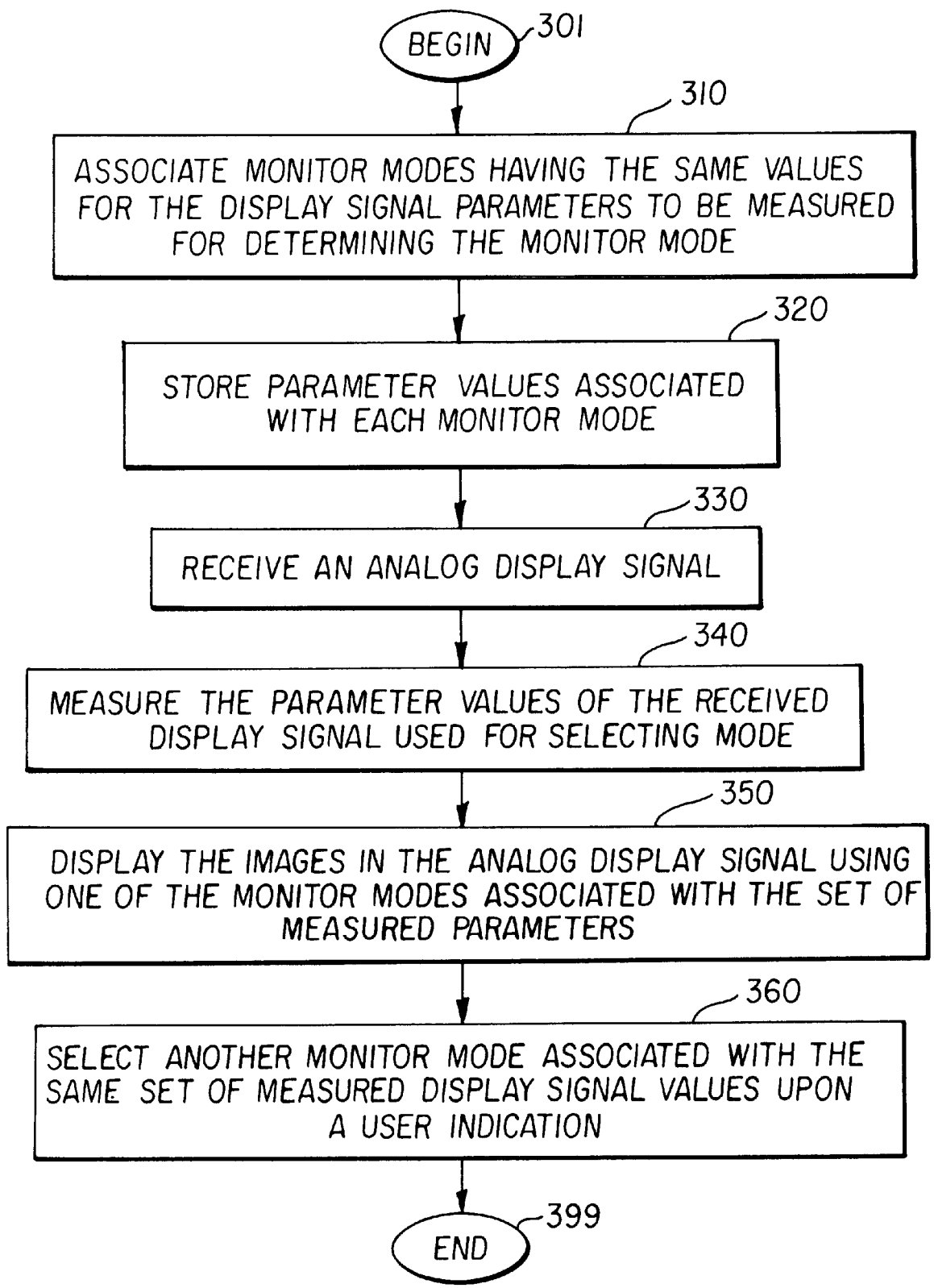
FIG. 3 is a flow-chart illustrating a method in accordance with the present invention which enables a user to select a suitable monitor mode for processing a received analog display signal.

FIG. 3 is a flow-chart illustrating a method in accordance with the present invention. In step 310, storage is provided for specifying multiple monitor modes associated with each set of expected signal parameter values. Each monitor mode in turn is defined by a set of monitor parameters, Accordingly, if different source modes cannot be distinguished by measuring the signal parameter values, multiple monitor modes with each monitor mode corresponding to one of the undistinguishable modes is maintained. As described below, a user is provided the interface to sample a received signal using any of the monitor modes associated with a matching set of signal parameters. The data is preferably stored in any non-volatile memory so that the monitor modes can be used later.

In step 320, the monitor parameter values associated with each monitor mode are stored. The manufacturer of the display units typically stores monitor parameters for some modes corresponding to industry standards and/or most popular manufacturers of graphics controller 260. The present invention enables a user to either modify the values or store a monitor mode with the modified values as a new monitor mode associated with the same measured values. The implementation of a user-interface to request a user to specify whether the parameters of a pre-stored monitor mode should be modified or whether the changed values should be stored as a new mode will be apparent to one skilled in the relevant arts.

The feature of storing a present operating monitor mode with modified parameters as a new mode can be useful in several situations. For example, a digital display unit may be used in conjunction with several computer systems using graphics controllers from different monitors. Some of these graphics controllers may be generating display signals with substantially equal measured display signal parameters, but which require different monitor modes for satisfactory sampling. Once the appropriate monitor mode is determined with some parameters potentially adjusted, the operating mode can be saved as a new mode associated with the same measured signal parameter values. Once saved, the new mode can be used later any time in accordance with the present invention.

Thus, step 310 and 320 enable different monitor modes (either pre-configured or new) to be associated with the measured parameter values of an analog display signal. In step 330, an analog display signal is received. In step 340, the parameter values used for an initial determination of a suitable monitor mode are measured typically by examining the analog display signal being received. In step 350, one of the monitor modes associated with the measured set of display signal parameter values is selected. The signal being received is processed using the monitor mode parameters associated with the selected monitor mode. As a result of such processing, the images encoded in the received display signal are displayed.

The present invention enables a user to specify whether the monitor mode needs to be changed. If a user indicates that the monitor mode needs to be changed, another monitor mode associated with the same set of display signal parameters is selected for processing the analog display signal in step 360. The user can continue to change the monitor mode until a suitable monitor mode is used for display.

The manner in which a user specifies that the monitor mode needs to be changed needs to be simple. In one embodiment, an adjustment button is provided on the display monitor. The user simply needs to press the button to change the monitor mode. Each time the button is pressed, a new monitor mode (typically associated with the same measured parameter values) is selected.

In an alternative embodiment, a user can use the on-screen-display providing a menu for changing the monitor mode. By using the menu, a user can request a change of the monitor mode. Several schemes can be implemented using the method of FIG. 2. The manner in which steps 330, 340, 350, and 360 can be implemented in one or more example embodiments is described below in further detail.

4. Details of the Method of the Present Invention

Figure 4A:
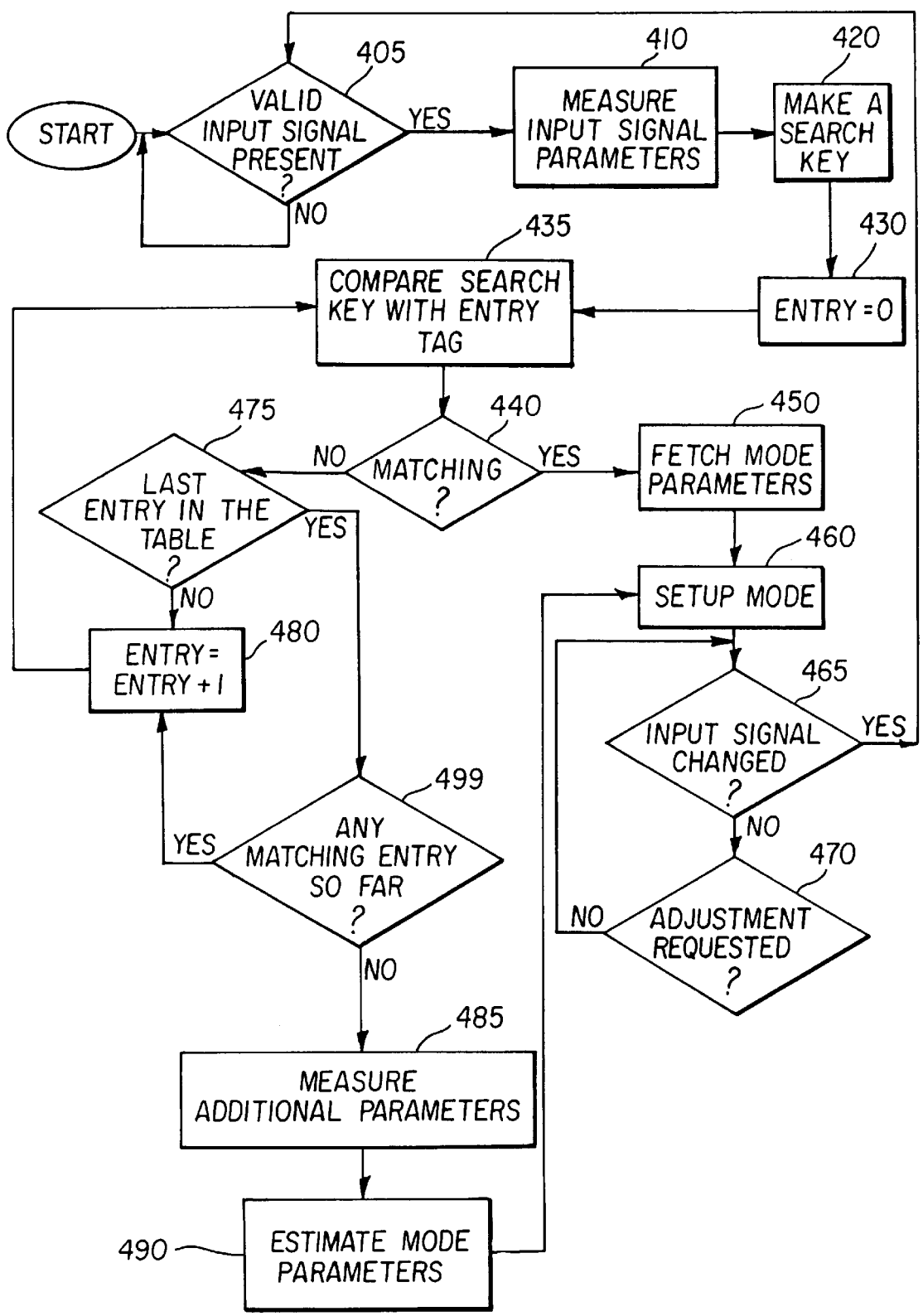
FIG. 4A is a flow-chart illustrating the implementation of a method in accordance with the present invention.

FIG. 4A is a flow-chart illustrating further details of a method in accordance with the present invention. In step 405, the digital display monitor determines whether a valid display signal is being received. In step 410, the display signal parameters used for an initial determination of the suitable monitor mode are measured. Typically, one or more of VTOTAL, refresh rate, synchronization signal polarities, the duration of various synchronization signals, the horizontal line period (time between successive HSYNC signals), among others are used for such an initial determination.

The measured set of values can be used to select one of the associated modes in one of several ways. Comparing all of the measured values with corresponding mode parameter values can be processing and memory accesses intensive, leading to unnecessary time delays. To decrease the number of comparisons, a search key is generated from the measured values in one of known schemes in step 420. The scheme needs to be generally produce a unique number for parameters values which differ in insignificant aspects. An entry tag is associated with each monitor mode stored in the display unit. The entry tag is computed using a scheme similar to that used in step 420.

Steps 430, 435, 440, and 480 operate to select a next monitor mode with a matching set of monitor parameter values. During a first iteration, as entry is set to zero in step 430, the first of the suitable monitor modes is selected. Specifically, the search key computed in step 420 is compared with the entry tag associated with a monitor mode identified by the entry number. As entry number is equal to 0 during the first iteration, the monitor mode table is searched from the first entry. If a match is not detected in step 440, the next entry is searched for a match by incrementing the entry number in step 480. The entry number is made to wrap around such that the search continues with the first entry after the last mode. The comparison and tests for matching (steps 435, 440, and 445) are continued until a matching entry is detected in step 440.

Steps 475, 499, 485 and 490 operate to define a new monitor mode should at least one matching entry not be found. That is, if an entry considered in a present iteration is a last entry (determined in step 475), the display unit determines whether any matching entry has been detected so far (step 499). If no matching entry has been detected so far, additional source parameters (typically timing parameters of the source image signal) are measured in step 485. Any other monitor mode parameters which cannot be measured by examining the source signal, are estimated in step 490. Steps 485 and 490 may be performed in a known way. The parameters determined in steps 485 and 490 define a new mode and control passes to step 460.

Once a matching monitor mode is detected in step 440 or new mode is defined in steps 485 and 490, the monitor mode parameters are fetched from a memory (step 450), and the display unit is set up with the parameters (step 460). The manner in which the display unit can be set up with the parameters is described in further detail with reference to FIG. 5. Once set up, the display signal is processed according to the selected monitor mode found to have matched in step 440. In step 465, the display signal parameters are measured to determine whether the source mode has changed. If the mode has changed control passes to step 405. Otherwise, the display unit determines whether an adjustment (or change of monitor mode) is requested in step 470.

Once a monitor mode is requested to be changed, the search can continue from the next monitor mode in the stored table. Accordingly, control passes to step 445, where the entry number is incremented. The entry tag of the corresponding monitor mode is compared with the search key generated in step 420, and the display process continues.

Figure 4B:
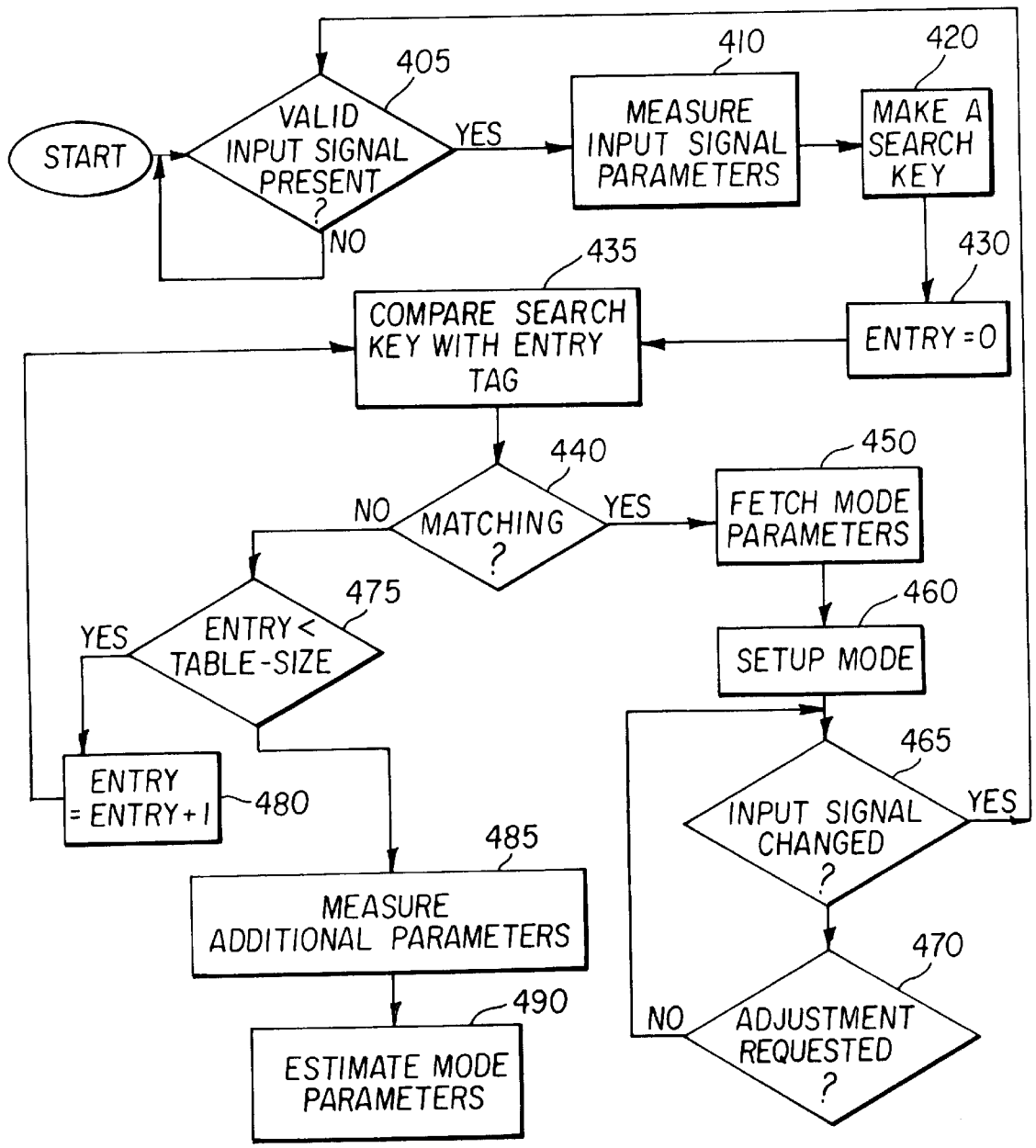
FIG. 4B is a flow-chart illustrating another implementation of a method in accordance with the present invention.

As should be readily apparent, the above described scheme of FIG. 4A continues to search for a proper monitor mode in a circular fashion if at least one matching mode is found. Instead it may be desirable to define a new mode once all the entries of the table are considered and a user is not satisfied with the matched modes. In an alternative embodiment shown in FIG. 4B, the entries are searched sequentially only. When all the modes have been compared, the digital display unit undertakes the definition of a new monitor mode. Steps similar in FIGS. 4A and 4B are referred to by similar numerals. The description of such similar steps is not repeated for conciseness. Only the differences are described.

Broadly, the method of FIG. 4B differs from that in FIG. 4A in that when all the monitor modes presently defined and stored in a digital display unit are deemed unsatisfactory (either due to a lack of matching mode or due to user requesting new modes) for processing a display signal presently being received, the method of FIG. 4B defines a new monitor mode. Specifically, when the entry number is determined to be greater than the maximum table size in step 475, some of the additional monitor mode parameters (e.g., display signal parameters) are measured in step 485 and others are estimated in step 490.

Thus, the methods of FIGS. 3, 4A and 4B can be used to process a received analog display signal to display the images encoded therein. At least using the above-described methods, several digital display units can be implemented. An example digital display unit implemented in accordance with the present invention is described below with reference to FIG. 5.

5. An Embodiment of Digital Display Unit

Figure 5:
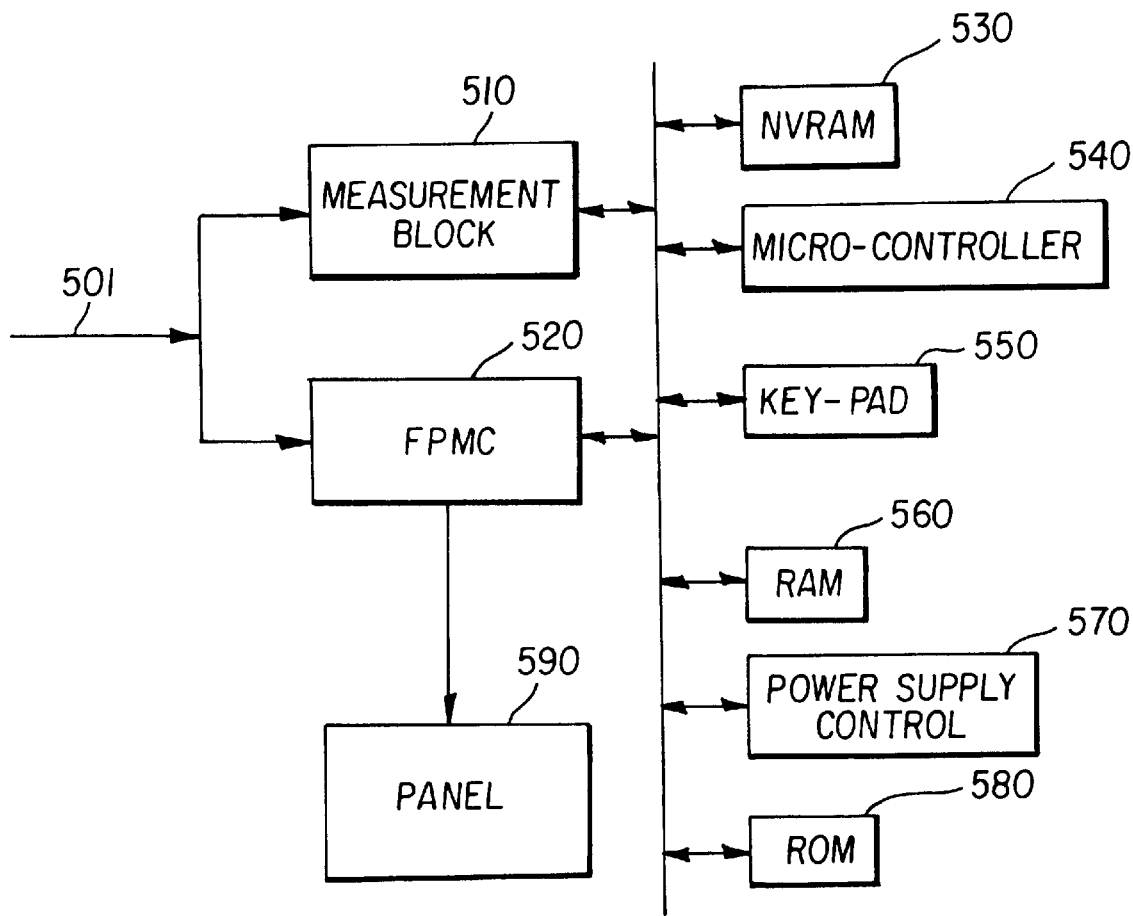
FIG. 5 is a block diagram of a digital display unit illustrating an embodiment of the present invention.

FIG. 5 is a block diagram of digital display unit 270 illustrating an embodiment in accordance with the present invention. Digital display unit 270 can include measurement block 510, flat panel monitor controller 520, non-volatile random access memory (NVRAM) 530, micro-controller 540, key-pad 550, random access memory (RAM) 560, power supply 570, read-only-memory (ROM) 580, and display screen 590.

The monitor modes and corresponding parameters are stored in a non-volatile memory such as NVRAM 530. At least as noted above, more than one monitor mode may be associated with a set of display signal parameter values. A user can indicate whether a mode needs to be changed, for example, by actuating a button associated with key-pad 550 or by using a on-screen-display menu. Micro-controller 540 receives the indications from an interface (e.g., connections to bus or other communication path). The manner in which the monitor modes are changed in accordance with user inputs is described below with reference to individual components.

Measurement block 510 receives an analog display signal on line 501, and measures some of the display signal parameters used for determining a suitable monitor mode. The parameters can be measured in a known way. As noted above, the refresh rate, the VTOTAL, synchronization signals polarity, the duration of the synchronization signals, and the horizontal line period are typically measured. Measurement block 510 sends the measured signal parameters on local bus 599.

Micro-controller 540 receives the measured display signal parameters and determines a suitable monitor mode for processing the display signal. Micro-controller 540 can retrieve data from NVRAM 540 for such a determination. Micro-controller 540 can be connected to NVRAM 540 by any suitable memory interface. Once a suitable monitor mode is determined, micro-controller 540 retrieves the monitor mode parameters also from NVRAM 530, and sets up various components to process the analog display signal to be received on input line 501.

Upon receiving an indication that the monitor mode needs to be changed (for example, due to a user pressing a button provided with keypad 550), micro-controller 540 determines another one of the monitor modes stored in NVRAM 530. The determination can be made in accordance with the flow-charts of FIGS. 3, 4A or 4B. The components of display unit 270 are again setup to process the display signal according to the determined mode.

In an embodiment, display screen comprises flat-panel 590. Flat-panel 590 includes several pixels which are actuated to generate the display of an image. Flat panel monitor controller 520 provides the signals to actuate the individual pixels as described below.

Flat panel monitor controller (FPMC) 520 receives the monitor parameters corresponding to a determined mode and processes the analog display signal to generate signals for displaying images on flat panel 590. For example, FPMC receives HTOTAL, VTOTAL and refresh rate to determine the frequency at which to sample the display data included in the analog display data signal.

FPMC can also receive the source image width and height, and the start positions, which enable a determination of the sampled values which form an image to be displayed. FPMC 520 can perform any upscaling or downscaling necessary to display the image at a desired size. In addition, the monitor mode parameters can specify any brightness adjustments, gamma correction parameters and FPMC adjust the values of the pixel data elements. Using such pixel data elements, FPMC sends signals to panel 590 to display the images encoded in the received display signal.

Power supply control 570 controls the supply of electrical power to all components of display unit 270. ROM 580 stores any data which may need to be stored without modification. For example, a default set of monitors modes can be stored. In contrast, NVRAM 530 can store all display modes including the changed parameter values for any modes. In addition, ROM 580 can store any software code for micro-controller 540 to execute. The software code can control the operation of the overall display unit 270.

Thus, display unit 270 enables a user to conveniently select any of the monitor modes associated with a set of display signal parameter values. Such a feature is particularly useful in environments where multiple source modes share (substantially) the same display signal parameters. Each monitor mode can correspond to one of such source modes, and by selecting the correct monitor mode, the images encoded in the display signal can be accurately reproduced.

6. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of displaying a plurality of images on a digital display unit of a computer system, wherein images are encoded in an analog display signal using one of a plurality of source modes and wherein said digital display unit displays said plurality of images using a corresponding one of a plurality of monitor modes, wherein said plurality of source modes are characterized by a plurality of display signal parameters, wherein said digital display unit selects one of said plurality of monitor modes by measuring one or more of said display signal parameters and wherein at least some of said plurality of source modes have common values for said measured display signal parameters, said method comprising the steps of:

(a) associating monitor modes having the same values for said one or more of said display signal parameters used for selecting a monitor mode;

(b) receiving said analog display signal in said digital display unit;

(c) measuring said one or more of said display signal parameters of said received analog display signal;

(d) selecting one of the monitor modes associated with the values measured in step (c);

(e) processing said analog display signal using said monitor mode selected in step (d); and (e) enabling a user to select from among any monitor modes associated with the values measured in step (c), whereby a user can select a correct monitor mode to display said plurality of images when at least some of said plurality of source modes cannot be distinguished by measuring said one or more of said display signal parameters.

2. The method of claim 1, wherein step (e) comprises the step of providing a button, which when pressed causes said digital display unit to select from among other monitor modes.

3. The method of claim 1, wherein step (e) comprises the step of providing an on-screen-display menu with an entry to change a monitor mode, and the selection of which causes said digital display unit to select from among other monitor modes.

4. The method of claim 1, further comprising the step of selecting said modes associated with the values measured in step (c) circularly in response to an indication from a user to change a monitor mode.

5. The method of claim 1, further comprising the step of defining a new monitor mode when a user requests a change of monitor mode after said analog display signal is processed using all monitor modes associated with the values measured in step (c).

6. The method of claim 1, further comprising the step of enabling the user to change some monitor mode parameters and save the changed parameters.

7. The method of claim 1, wherein said analog display signal comprises one of red, blue or green signals.

8. A digital display unit for displaying a plurality of images, wherein images are encoded in an analog display signal using one of a plurality of source modes and wherein said digital display unit displays said plurality of images using a corresponding one of a plurality of monitor modes, wherein said plurality of source modes are characterized by a plurality of display signal parameters, wherein said digital display unit selects one of said plurality of monitor modes by measuring one or more of said display signal parameters and wherein at least some of said plurality of source modes have common values for said measured display signal parameters, said digital display unit comprising:

storage means for associating monitor modes having the same values for said one or more of said display signal parameters used for selecting a monitor mode;

receiving means for receiving said analog display signal;

measuring means for measuring said one or more of said display signal parameters of said received analog display signal;

selection means for selecting one of the monitor modes associated with the values measured by said measuring means;

processing means for processing said analog display signal using said monitor mode selected by said selection means; and enabling means for enabling a user to select from among any monitor modes associated with the values measured by said measuring means, whereby a user can select a correct monitor mode to display said plurality of images when at least some of said plurality of source modes cannot be distinguished by measuring said one or more of said display signal parameters.

9. A digital display unit for displaying a plurality of images, wherein images are encoded in an analog display signal using one of a plurality of source modes and wherein said digital display unit displays said plurality of images using a corresponding one of a plurality of monitor modes, wherein said plurality of source modes are characterized by a plurality of display signal parameters, wherein said digital display unit selects one of said plurality of monitor modes by measuring one or more of said display signal parameters and wherein at least some of said plurality of source modes have common values for said measured display signal parameters, said a digital display unit comprising:

a non-volatile memory for storing data associating monitor modes having the same values for said one or more of said display signal parameters used for selecting a monitor mode, said non-volatile memory further storing a plurality of monitor mode parameter values associated with each of said monitor modes;

receiving means for receiving said analog display signal;

a measurement block for measuring said one or more of said display signal parameters of said received analog display signal;

a micro-controller for selecting one of the monitor modes associated with the values measured by said measurement block;

a flat panel screen for displaying said plurality of images;

a flat panel monitor controller coupled to said micro-controller and said flat-panel screen, said flat panel monitor controller for processing said analog display signal using said monitor mode selected by said selection means and said plurality of monitor mode parameter values associated with the selected monitor mode; and enabling means for enabling a user to select from among any monitor modes associated with the values measured by said measurement block, whereby a user can select a correct monitor mode to display said plurality of images when at least some of said plurality of source modes cannot be distinguished by measuring said one or more of said display signal parameters.

10. The display unit claim 9, wherein said enabling means comprises a button, which when pressed causes said digital display unit to select from among other monitor modes.

11. The display unit claim 9, wherein step enabling means comprises means for providing an on-screen-display menu with an entry to change a monitor mode, and the selection of which causes said digital display unit to select from among other monitor modes.

12. The display unit claim 9, wherein said micro-controller is designed to select said monitor modes circularly in response to an indication from a user to change a monitor mode.

13. The display unit claim 9, wherein said micro-controller is designed to define a new monitor mode when a user requests a change of monitor mode after said analog display signal is processed using all monitor modes associated with the values measured by said measurement block.

14. A circuit for use in digital display unit of a computer system, said circuit for displaying a plurality of images, wherein images are encoded in an analog display signal using one of a plurality of source modes and wherein said digital display unit displays said plurality of images using a corresponding one of a plurality of monitor modes, wherein said plurality of source modes are characterized by a plurality of display signal parameters, wherein said digital display unit selects one of said plurality of monitor modes by measuring one or more of said display signal parameters and wherein at least some of said plurality of source modes have common values for said measured display signal parameters, said circuit comprising:

a memory interface for storing and receiving data from a non-volatile memory, wherein said data associates monitor modes having the same values for said one or more of said display signal parameters used for selecting a monitor mode, said data further defining a plurality of monitor mode parameter values associated with each of said monitor modes;

receiving means for receiving said analog display signal;

a measurement block for measuring said one or more of said display signal parameters of said received analog display signal;

a micro-controller for selecting one of the monitor modes associated with the values measured by said measurement block;

a flat panel monitor controller coupled to said micro-controller and a flat-panel screen, said flat panel monitor controller for processing said analog display signal using said monitor mode selected by said selection means and said plurality of monitor mode parameter values associated with the selected monitor mode; and a user interface for receiving signals from a user indicating that a new monitor mode needs to be selected, wherein said micro-controller selects another monitor mode from among monitor modes associated with the values measured by said measurement block, whereby a user can select a correct monitor mode to display said plurality of images when at least some of said plurality of source modes cannot be distinguished by measuring said one or more of said display signal parameters.

* * * * *